(12) United States Patent
Kermani et al.

(10) Patent No.: US 6,226,726 B1
(45) Date of Patent: May 1, 2001

(54) MEMORY BANK ORGANIZATION CORRELATING DISTANCE WITH A MEMORY MAP

(75) Inventors: Bahram G. Kermani, Whitehall; Vladimir Sindalovsky, Perkasie, both of PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/075,946

(22) Filed: May 12, 1998

Related U.S. Application Data
(60) Provisional application No. 60/065,855, filed on Nov. 14, 1997.

(51) Int. Cl.[7] .................................................. G06F 12/06
(52) U.S. Cl. .............................. 711/170; 711/154; 711/5
(58) Field of Search ................................ 711/5, 104, 105, 711/154, 170

(56) References Cited

U.S. PATENT DOCUMENTS

| | | | |
|---|---|---|---|
| 5,561,825 | * 10/1996 | Yamagami et al. | 395/878 |
| 5,946,483 | * 8/1999 | Boutaud et al. | 395/564 |

OTHER PUBLICATIONS

IBM, "High–Speed Multi–Function Computer Clock Circuit With a Variable Frequency Output", Jun. 1, 1984, vol. 27, Iss. 1B, p. 795–796, IBM TDB.*

* cited by examiner

*Primary Examiner*—Kevin L. Ellis
(74) *Attorney, Agent, or Firm*—William H. Bollman

(57) ABSTRACT

Memory banks are assigned to the memory map of a common processor in an order corresponding to a physical characteristic of the respective memory bank, e.g., a physical distance to the processor and/or an electrical distance to the processor. In this way, the operating frequency of the processor can be increased beyond conventionally guaranteed limits at the expense of abandoning the farthest memory banks when not necessary for a particular application. Similarly, abandonment of the farther memory banks in accordance with the principles of the present invention allows operation of the processing system at higher temperatures and/or lower power voltages. In another embodiment of the present invention, wait states may be added to accesses to the farther memory banks such that the closest memory banks may be operated at the highest possible performance level, e.g., without any wait states. The performance of the individual memory banks may be monitored and a wait state table adjusted to adjust to environmental conditions such as temperature and/or power voltage.

19 Claims, 6 Drawing Sheets

FIG. 3

| MEMORY BANK | REQUIRED WAIT STATES |
|---|---|
| #1 | 0 |
| #2 | 0 |
| #3 | 1 |
| #4 | 1 |
| #5 | 1 |
| #6 | 1 |
| #7 | 2 |
| #8 | 2 |
| #9 | 2 |
| #10 | 2 |
| #11 | 3 |
| #12 | 3 |
| #13 | 3 |
| #14 | 3 |

MEMORY BANK ORGANIZATION CORRELATING DISTANCE WITH A MEMORY MAP

This application claims priority from U.S. Provisional Application Ser. No. 60/065,855, entitled "Multipurpose Digital Signal Processing System", filed on Nov. 14, 1997, the specification of which is hereby expressly incorporated herein by reference.

BACKGROUND OF THE INVENTION

1. Field of the Invention

This invention relates generally to memory systems utilizing a plurality of memory banks with respect to a common processor. More particularly, it relates in one aspect to the assignment of enable signals and/or wait states to a plurality of memory banks to optimize the performance of a processing system.

2. Background of Related Art

The use of a plurality of memory banks within a processing system is common. For instance, FIG. 5 shows a plurality of memory banks, e.g., fourteen memory banks 901–914 being accessed over a common address and data bus of a processor 900.

In particular, FIG. 5 shows a processor 900 in communication with fourteen memory banks 901–914. The memory banks 901–914 may be any suitable size memory for the particular application. For instance, each of the memory banks 901–914 may be a 1K memory bank.

Conventionally, there is no particular rule utilized in assigning addresses to each of the individual memory banks 901–914 in the memory map of the processor 900. For instance, frequently a simple sequencing through rows and/or columns of physical locations of the memory banks 901–914 on a circuit board or integrated circuit 920 is utilized to assign a plurality of memory banks as shown in FIG. 5.

FIG. 5 shows the use of a conventional technique, i.e., arbitrary assignment, of memory banks 901–914 having a first memory bank 901 in a first row and first column assigned as memory bank No. 1. A second memory bank 902 in the first row and second column is arbitrarily assigned as memory bank No. 2, and the third memory bank 903 in the first row and third column is arbitrarily assigned as memory bank No. 3.

Similarly, the memory bank 904 in the second row and first column of memory banks 901–914 is assigned the next available memory address range, e.g., memory bank No. 4. The memory bank 905 in the second row and second column is assigned as memory bank No. 5, the memory bank 906 in the second row and third column is assigned as memory bank No. 6, and the memory bank 907 in the second row and fourth column is assigned as memory bank No. 7. The third row of memory banks 908–911 is assigned as memory banks No. 8 through No. 11, respectively, and the fourth row of memory banks 912–914 is assigned as memory banks No. 12 through No. 14, respectively.

FIG. 6 shows the resulting memory map of the processor 900 shown in FIG. 5, assuming as an example that each of the memory banks 901–914 are 1 kilobytes (1K) in length.

In particular, in FIG. 6, the memory bank 901 assigned as memory bank No. 1 will be accessed by the processor 900 in an address range of 0 up to 1K-1. (For simplicity, 1K-1, 2K-1, etc. will be referred to herein as 1K, 2K, etc.). The memory bank 902 assigned as memory bank No. 2 will be accessed by the processor 900 in an address range of 1K up to 2K. Similarly, the third memory bank 903 through the fourteenth memory bank 914 will be accessed in a contiguous and sequential memory range of the processor from 2K up to 14K. Ultimately, the assignment of the fourteen memory banks 901–914 in the memory map of the processor 900 provides the processor 900 with, e.g., contiguous or piecewise contiguous memory equal in length to the total length of all memory banks 901–914, e.g., 14K of contiguous memory.

With arbitrarily or sequentially assigned memory banks 901–914, e.g., as shown in FIG. 5, processing performance can be guaranteed only as fast as the slowest memory bank will allow. However, capacitance and resistance in the electrical connections between the processor 900 and the respective memory banks 901–914 slows down the electrical signals between the processor 900, the line drivers, and the respective memory banks. This increases access time and decreases processing performance as the memory banks become physically/electrically more distant from the processor 900 and/or as the electrical lines between the processor 900 and the respective memory banks 901–914 increase in length.

To reduce the capacitance and/or resistance between the memory banks 901–914 and the processor 900, conventional memory system designs locate the processor 900 as close as possible to the most distant memory banks, e.g., memory banks 907 and 911 as shown in the example of FIG. 5. Nevertheless, reduction of the capacitance and/or resistance between the processor 900 and the farthest memory bank oftentimes pushes the envelope of current technology.

Thus, even presuming that the processor 900 on a circuit board or integrated circuit 920 is located as close as possible to the memory banks 901–914, there will always be one or more memory banks, e.g., memory bank No. 7 or memory bank No. 11 as shown in FIG. 5, which will be more distant from the processor 900, either physically and/or electrically, than another one of the memory banks, e.g., memory bank No. 4.

The inevitable result that at least one memory bank will be farther either physically and/or electrically from the processor 900 than another results in an unavoidable limitation on the processing performance of the system: that the processing performance will be limited to that between the processor 900 and the farthest memory bank, e.g., memory bank No. 7 as shown in the example of FIG. 5. Accordingly, conventional processing systems improve overall performance by, among other things, utilizing sophisticated techniques to minimize the physical distance between a processor and the plurality of memory banks with which it will communicate.

Although continual technology advances allow smaller memory elements and closer compaction between memory elements providing shorter distances both electrically and physically to the processor as time goes on, conventional systems nevertheless fail to provide a performance any better than the worst case scenario of the memory system.

There is thus the need to improve processing performance given inevitable constraints when using a plurality of memory banks, e.g., that one memory bank will always be farther than another.

SUMMARY OF THE INVENTION

In accordance with the principles of the present invention, a processing system comprises a plurality of memory banks, and a processor having a memory map. Each of the plurality of memory banks is assigned in order to the memory map of the processor based on a respective physical distance or electrical distance to the processor.

In accordance with another aspect of the present invention, a processing system comprises a memory bank, and at least two processors adapted for operation at a similar frequency. Each of the at least two processors has a different number of wait states with respect to accesses to the memory bank.

A method of assigning a plurality of memory banks to a contiguous memory map of an accessing processor in accordance with the principles of the present invention comprises correlating an ordering of the plurality of memory banks in the contiguous memory map with an ordering of respective distances of the plurality of memory banks from the accessing processor.

BRIEF DESCRIPTION OF THE DRAWINGS

Features and advantages of the present invention will become apparent to those skilled in the art from the following description with reference to the drawings, in which:

FIG. 3 shows a lookup table utilized by the processor shown in FIG. 1 to insert wait states for physically and/or electrically more distant memory banks, in accordance with the principles of the present invention.

DETAILED DESCRIPTION OF ILLUSTRATIVE EMBODIMENTS

The present invention provides for the assignment of memory banks to a processor in a processing system in an order based on a physical and/or electrical distance between the respective memory bank and the accessing processor. The correlation between lower memory banks with shorter distances to the processor allows for increased performance when using only the lowest memory banks, i.e., only those memory banks which are physically and/or electrically closest to the processor.

Figure 1:
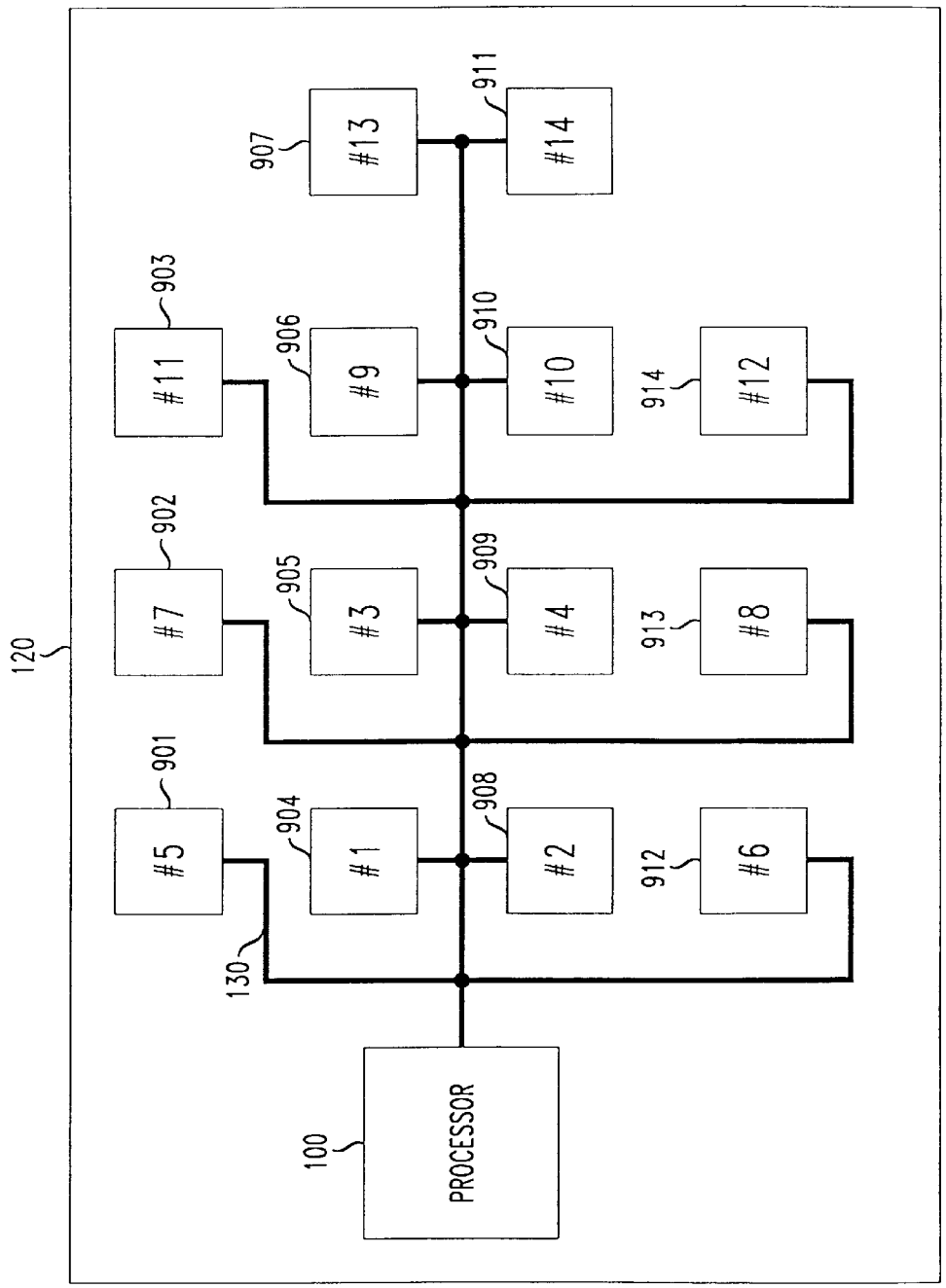
FIG. 1 shows a memory system including a plurality of memory banks assigned according to a physical and/or electrical distance from an accessing processor, in accordance with the principles of the present invention.

FIG. 1 shows an example of a plurality of memory banks 901–914 assigned to a common processor 100 in an order based on a physical distance between the respective memory banks 901–914 and the processor 100, in accordance with the principles of the present invention. The plurality of memory banks 901–914 can be co-located on a circuit board and/or on an integrated circuit, shown collectively as 120.

A processor 100 has a common address, data and control (ADC) bus 130 in communication with the plurality of memory banks, e.g., fourteen memory banks 901–914. FIG. 1 is simplified to show the concept of the present invention and thus other control signals which may be necessary in a particular application, e.g., a clock signal from the processor 100 to the memory banks 901–914 in the case of synchronous memory, is not shown. Moreover although fourteen memory banks 901–914 are shown in FIG. 1, the present invention relates to any memory system of any size, i.e., having at least two memory banks.

FIG. 1 depicts the physical locations of the memory banks 901–914 with respect to the processor 100 for the purposes of description of the present invention. It is to be understood that memory banks may be placed in any suitable configuration both vertically and horizontally with respect to the processor 100 depending upon the particular application.

Furthermore, the address, data and control bus 130 as shown in FIG. 1 is an example of a possible layout and routing of electrical wiring between the processor 100 and each of the memory banks 901–914. However, it is to be understood that particular routing of electrical wiring carrying appropriate address, data and/or control signals between the processor 100 and the memory banks 901–914 may differ substantially from that as shown in FIG. 1 within the scope of the present invention.

Figure 2:
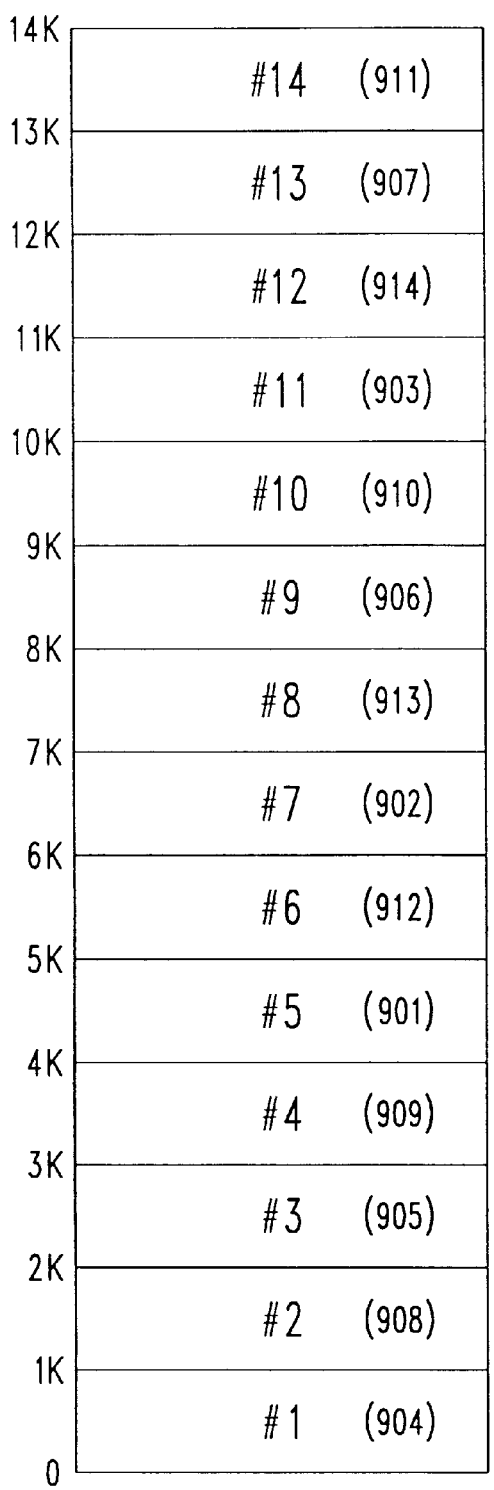
FIG. 2 shows a memory map in a processor having memory banks assigned in accordance with the principles of the present invention.

As shown in the particular example of FIG. 1, the physically closest memory bank to the processor 100 is the first memory bank of the second row, i.e., memory bank 904. In accordance with the principles of the present invention, memory bank 904 is thus assigned as the first memory bank address range in a memory map for the processor 100. In the disclosed example, addresses from the processor 100 in a range from zero to 1K will therefore physically access memory bank 904. The relevant portion of the memory map of the processor 100 with respect to the fourteen memory banks 901–914 is shown in FIG. 2. Of course, the invention is equally applicable to the assignment of any memory range corresponding to the available plurality of memory banks in a particular device.

The present invention is equally applicable when measuring physical distance/delay between any of the memory banks 901–914 and the processor as it is to the measurement of wiring distance, i.e., the length of the wiring, between any of the memory banks 901–914. The ordering of the memory banks 901–914 in physical distance may not necessarily coincide with the ordering of the memory banks 901–914 in electrical distances. However, the invention is equally applicable to an ordering by either physical distance to the processor or electrical distance to the processor, or a consideration of both physical distance and electrical distance. As shown in the example of FIG. 1, the first memory bank 904 is both the closest in physical and electrical distance to the processor 100.

A second memory bank 908 is substantially equidistant from the processor 100 as is the first memory bank 904, and thus may alternatively be assigned as memory bank No. 1 with respect to processor 100. Thus, being equidistant with respect to time delays from the processor 100, the memory banks 904, 908 in the disclosed example may alternatively be assigned as memory banks No. 2 and 1, respectively. Accordingly, addresses from the processor 100 corresponding to the length of two memory banks, e.g., 0 to 2K, will physically access memory banks 904 and 908.

The third and fourth memory banks 905, 909 which are considered to be the next closest devices physically to the processor 100 as shown in FIG. 1 are assigned as memory banks No. 3 and No. 4. In similar fashion, memory bank 901 is assigned as memory bank No. 5, memory bank 912 is assigned as memory bank No. 6, memory bank 902 is assigned as memory bank No. 7, memory bank 913 is assigned as memory bank No. 8, memory bank 906 is assigned as memory bank No. 9, memory bank 910 is assigned as memory bank No. 10, memory bank 903 is assigned as memory bank No. 11, memory bank 914 is assigned as memory bank No. 12, memory bank 907 is assigned as memory bank No. 13, and memory bank 911 is assigned as memory bank No. 14.

Of course, other factors may influence the assignment of two substantially equidistant memory banks into a memory map. For instance, with reference to FIG. 1, since the memory bank 902 and the memory bank 913 are substantially equidistant from the processor 100 in the disclosed example. Thus, the assignment of No. 7 and No. 8 is somewhat arbitrary as between these two memory banks 902, 913. However, since memory bank 913 is closest to the previous memory bank 912, assigned as No. 6, it may be alternatively selected as No. 7 (instead of No. 8 as shown in FIG. 1), and memory bank 902 may then be assigned No. 7. Similarly, memory banks 901 and 912 may alternatively be assigned as No. 6 and No. 5, respectively, and memory banks 903 and 914 may alternatively be assigned as No. 12 and No. 11, respectively.

FIG. 2 shows the resulting memory map of processor 100. Although the memory map is depicted as ranging from 0 to 14K, it is to be understood that the present invention is applicable to any memory range of a common processor having memory banks of any size. As shown in FIG. 2, the first memory bank in the lowest portion of the memory map is memory bank 904. Should the particular application running on the processor 100 require additional memory, the second memory bank 908 would be utilized in conjunction with memory bank 908 to provide a total memory address space of, e.g., 2K. Similarly, the processor 100 will utilize in order memory banks No. 3 through No. 14 as assigned in accordance with the principles of the present invention, i.e., memory banks 905, 909, 901, 912, 902, 913, 906, 910, 903, 914, 907, and 911, respectively.

When the processor 100 begins operation, it typically utilizes memory starting at address zero, and increments its way up to the higher addresses, e.g., up to 14K. For the simplicity of software design, it is desired to have a contiguous memory space corresponding to the plurality of provided memory banks. If the operation frequency of the processor 100 increases beyond the specified or advertised value, or if the temperature/voltage (power supply) conditions worsen, the overall operation of the processor 100 will not normally be guaranteed. The present invention provides a guarantee of the operation of the processor 100 at some higher operating frequencies or outside a specified range of temperatures and/or voltages beyond those normally guaranteed performance based on a worst case scenario determined in a conventional manner, assuming that the processor 100 may not require all available memory banks.

When a processor's speed is characterized at a particular performance value, e.g., 100 MHz, in most cases the speed of accessed memory is the limiting factor. Normally, the processor itself is capable of running at a higher frequency. The present inventors have appreciated that the speeds of today's processors are approaching the speed of the electrical signal passing through wiring between the processor and its memory banks. The present inventors have also appreciated that the memory banks which are physically and/or electrically closest to the processor will be capable of operation at a relatively higher frequency with respect to those memory banks which are farther from the processor 100.

Conventionally, a processing system is guaranteed or rated for performance at particular worst-case conditions, e.g., extreme variations from the nominal values of 25 degrees Celcius, 3.3 volts, 100 MHz. However, the same processing system is rated for operation utilizing all memory banks. The present invention organizes the assignment of memory banks for use by a processor in a processing system such that advantage can be taken of the increased capability of memory banks which are closest to the processor 100.

For instance, in the disclosed example of fourteen memory banks of contiguous memory, a user may likely not require all fourteen memory banks for operation of a particular application program. For instance, a user may require only twelve of the fourteen memory banks for operation of the application program. Nevertheless, utilizing conventional assignment techniques, the processing system will be bootstrapped to the capabilities of the slowest used memory bank.

By assigning the memory enable signals from address decode circuitry based on a distance to the processor from the respective memory banks 901–914, as conditions worsen, e.g., as the temperature increases, as the voltage drops, and/or as the frequency of the processor 100 increases, the first memory banks which will fail to perform suitably will likely be the uppermost assigned memory banks, i.e., according to the principles of the present invention, those memory banks which are most distant from the processor 100. Thus, the present invention overcomes the disadvantages of the conventional technique of arbitrarily assigned memory banks limiting the overall performance of the processing system.

Table I shows an example of the increased operating frequency capability of a processor, e.g., of a 100 MHz conventionally rated processor, as the required number of memory banks decreases from a maximum value, e.g., from 14, to a minimum value of a single memory bank. As can be seen clearly in this example, the present invention, all other conditions (e.g., temperature and voltage) remaining constant and within guaranteed levels, provides the capability to increase considerably the performance of a processor, e.g., by as much as 45 percent in the disclosed example. Note that the incremental benefits of the present invention are largest when only the memory banks closest to the processor 100 are used.

TABLE I (Voltage & Temperature Constant)

| Maximum # of Used Memory Banks | Maximum Operating Frequency (MHZ) |
|---|---|
| 14 | 100 |
| 13 | 105 |
| 12 | 109 |
| 11 | 113 |
| 10 | 116 |
| 9 | 121 |
| 8 | 126 |
| 7 | 129 |
| 6 | 133 |
| 5 | 135 |
| 4 | 140 |
| 3 | 142 |
| 2 | 143 |
| 1 | 145 |

The present invention finds similar performance enhancements with respect to other increased conditions beyond those which are conventionally guaranteed, e.g., temperature and voltage. For instance, Table II shows an example relationship between the temperature capability of the processing system and the number of memory banks utilized. In the example of Table II, the operating temperature of the processing system operating at a constant speed of, e.g., 100 MHz, at a constant supply voltage, e.g., at 3.3 volts, can be guaranteed at temperatures approaching 72° C. when utilizing only the closest memory bank to the processor 100. Note that the incremental benefit with respect to each additional memory bank used is relatively constant through the use of all fourteen memory banks in the disclosed example.

TABLE II (Voltage & Frequency Constant)

| Maximum # of Used Memory Banks | Maximum Operating Temperature (° C.) |
|---|---|
| 14 | 25 |
| 13 | 30 |
| 12 | 34 |
| 11 | 38 |
| 10 | 42 |
| 9 | 46 |
| 8 | 50 |
| 7 | 55 |
| 6 | 58 |
| 5 | 62 |
| 4 | 68 |
| 3 | 72 |
| 2 | 76 |
| 1 | 80 |

Table III shows a relationship between the number of memory banks from closest to farthest and the operating capability of the system, at a constant operating frequency, e.g., at 100 MHz, and at a constant temperature, e.g., 25° C., from a nominal 3.3 volts down to as low as 2.90 volts with only a single memory bank used.

TABLE III (Temperature & Frequency Constant)

| Maximum # of Used Memory Banks | Minimum Voltage Requirement (V) |
|---|---|
| 14 | 3.3 |
| 13 | 3.2 |
| 12 | 3.18 |
| 11 | 3.15 |
| 10 | 3.12 |
| 9 | 3.10 |
| 8 | 3.07 |
| 7 | 3.03 |
| 6 | 3.01 |
| 5 | 2.99 |
| 4 | 2.96 |
| 3 | 2.95 |
| 2 | 2.92 |
| 1 | 2.90 |

By allowing operation at higher temperatures and/or lower voltages in certain applications using less than all of the available memory, many advantages are obtained. For instance, the user may utilize a less expensive power supply and/or heat removal system if less than all memory banks are required for a particular application. Similarly, the present invention allows a user to operate the processor 100 at a higher frequency than nominally guaranteed when less than all memory banks are required for a particular application.

The features of the present invention become possible at the expense of abandoning memory banks which are farthest from the processor 100 if unused or unnecessary for the particular application. It is important to note that this is not necessarily a compromise between the software operating code and execution conditions. The software code may require fewer memory banks as compared with what is provided by the manufacturer of the processing system, and the excess memory may be taken advantage of by abandoning access to the farthest memory banks.

In another embodiment of the present invention, wait states can be added for accesses to the farthest memory banks to accommodate the longer access times required by farther memory banks without sacrificing the speed of the closes memory banks. Conventionally, the wait state mechanism is implemented for a processor when utilizing external, off-chip memory. It is this same mechanism which can be used to enhance the operating frequency, temperature or voltage performance of a processing system having memory banks assigned in accordance with the principles of the present invention.

For instance, after the basic characterization is performed on a processing system with respect to the memory banks, a required number of wait states for each memory bank with respect to a fastest memory bank may be established. For instance, memory banks which are closest either physically and/or electrically to the processor 100 will require a minimum number of wait states. The processor 100 is preferably suitably fast to at least match the speed capability of the closest memory bank. For those memory banks which are more distant from the processor 100 such as to not be capable of operation at the fastest frequency, highest temperature and/or lowest voltage of the processor, one wait state may be added to accesses to those memory banks.

Thus, in the example of FIGS. 1 and 2, a wait state lookup table such as that shown in FIG. 3 may be established for the processor 100. As shown in FIG. 3, memory banks No. 1 and 2 which are closest to the processor 100 would require zero wait states, and thus would allow the processor 100 to operate at its maximum performance, maximum temperature and/or lowest voltage. For those memory banks which are incrementally more distant from the processor 100, one wait state will be required, e.g., for memory banks No. 3 through 6. Similarly, additional categories of memory banks using additional numbers of wait states can be implemented. For instance, memory banks No. 7 through No. 10 may be required to utilize two wait states to provide guaranteed performance, and memory banks No. 11 through No. 14 may require three wait states. The number of wait states assigned depends on the real delay in accessing different memory banks and the granularity of the wait states.

Speed characterization can be done during simulation, emulation, and/or after manufacturing by sequentially operating the memory banks 901–914 from those which are closest to the processor 100 to those which are farthest from the processor 100 (FIG. 1). During these sequential operations, data read and write attempts may be made at maximum operating conditions of the processor 100. As the memory banks fail to perform, the number of wait states assigned for that particular memory bank may be incremented and re-tested until successful.

The memory bank vs. wait state table such as that shown in FIG. 3 may be maintained by software, making it possible to flexibly change wait state requirements as operating frequency, temperature and/or supply voltage change. Thus, real-time adjustment to slowly changing environmental conditions such as temperature or supply voltage is possible. In this proposed adjustable scheme, the assignment of memory banks can be decoded and wait states added to memory access cycles as necessary and maintained in a look-up table as shown in FIG. 3. This approach lifts the requirement for a predetermined assignment of the memory banks. Moreover, this memory bank vs. wait state table may be changed as processing systems mature into technologically advanced manufacturing processes.

Figure 4:
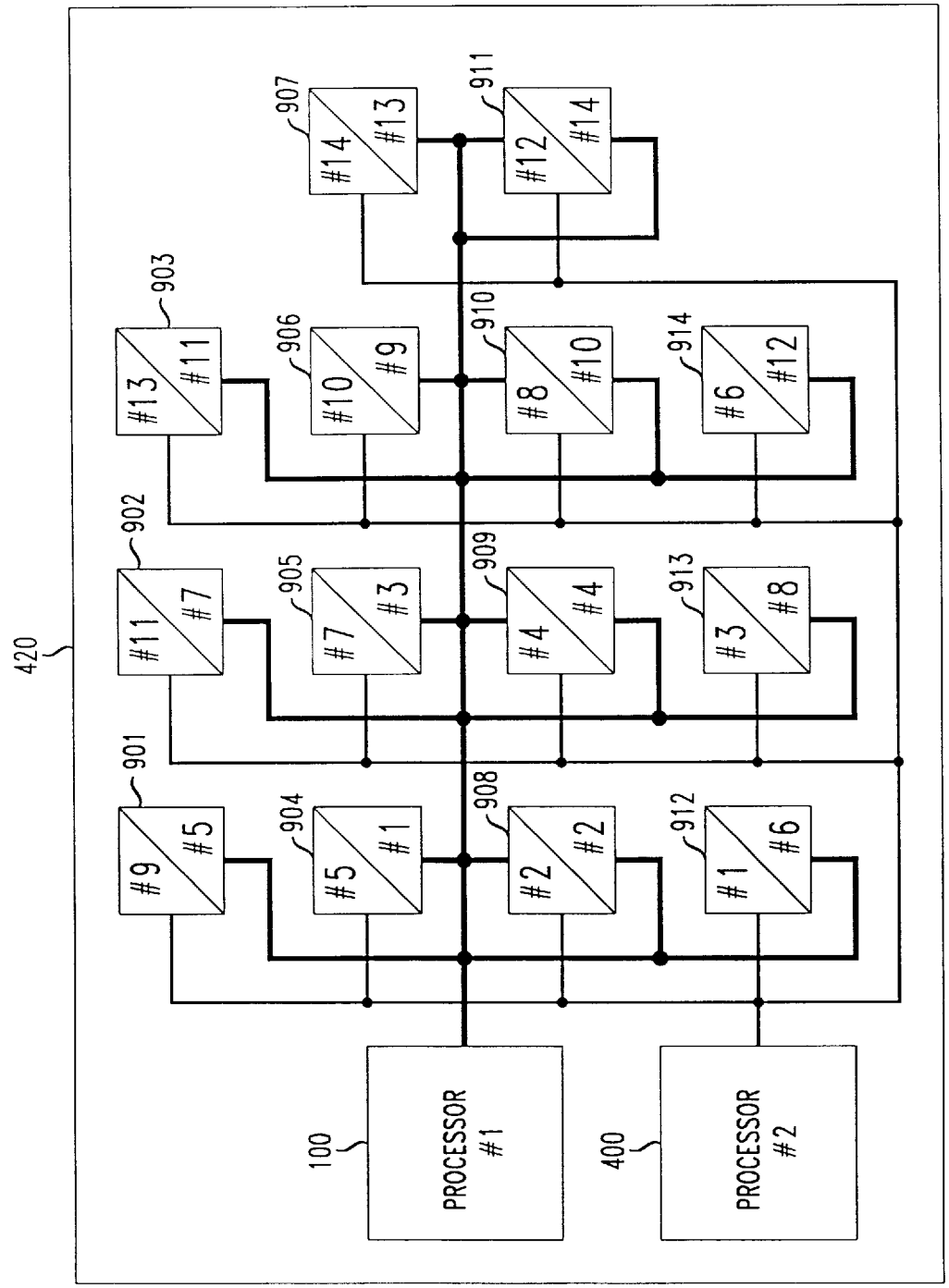
FIG. 4 shows another embodiment of the present invention wherein any one of a plurality of processors may share a common memory bank and be assigned the common memory banks in a differing order, in accordance with another aspect of the present invention.
Figure 5:
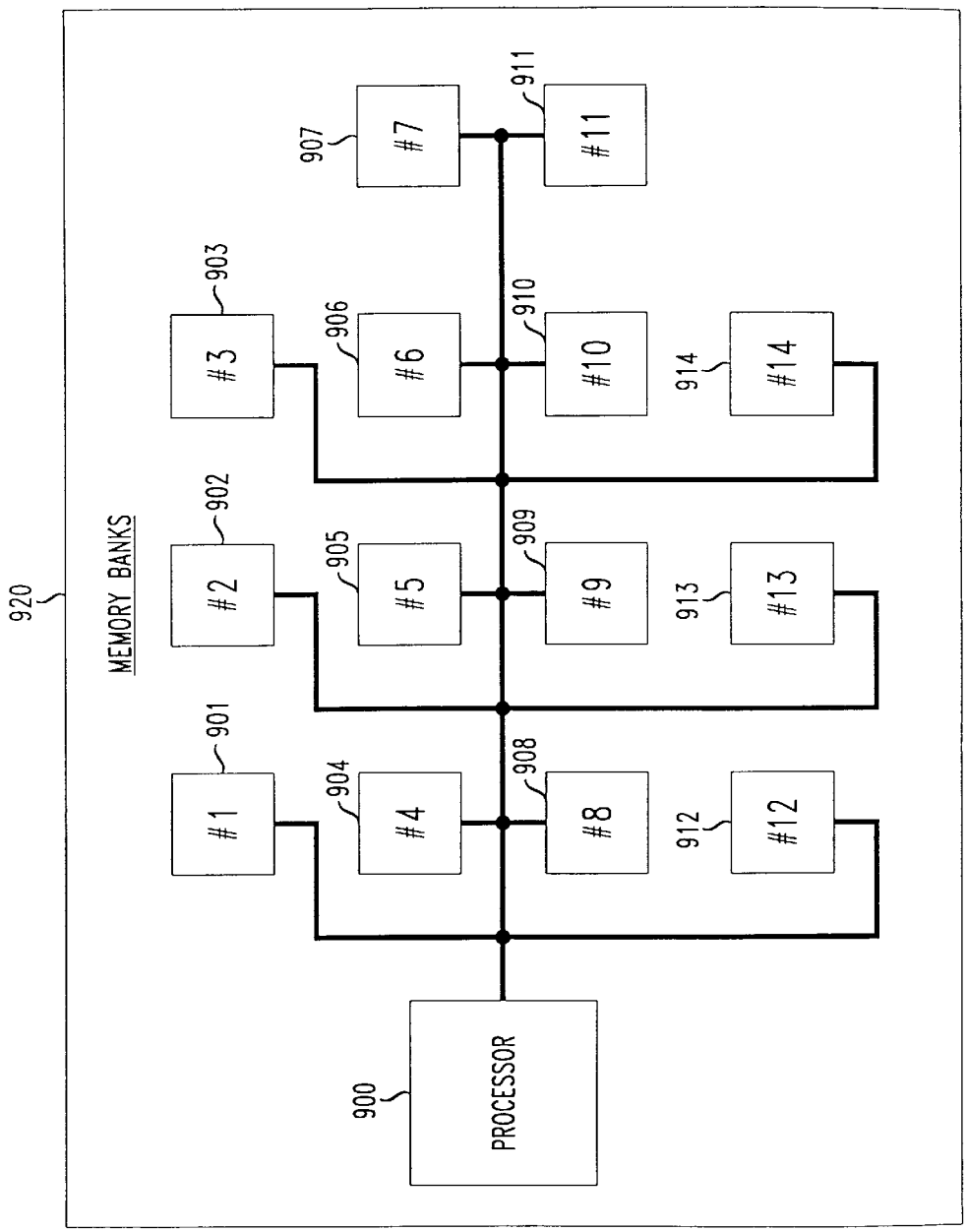
FIG. 5 shows a memory system including a plurality of memory banks assigned in a conventional manner.
Figure 6:
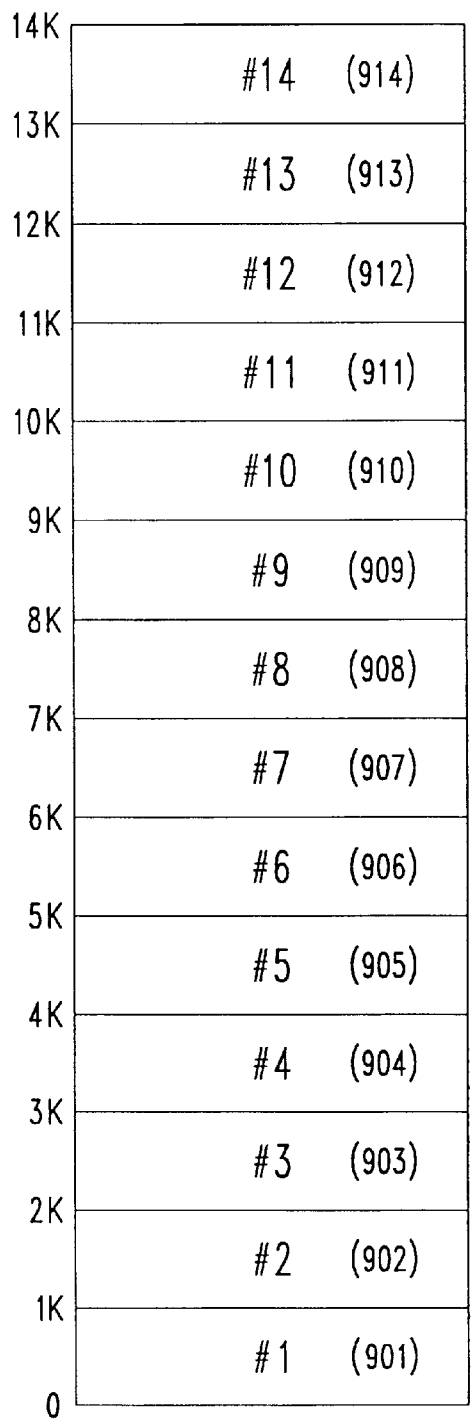
FIG. 6 shows a memory map in a processor having memory maps assigned in the conventional manner as shown in FIG. 5.

FIG. 4 shows another embodiment of the present invention wherein a plurality of processors 100, 400 access a common plurality of memory banks 901–914.

In particular, the aspects of the present invention as described above are implemented separately for each processor 100, 400 on a circuit board or integrated circuit 420 as shown in FIG. 4. Thus, while any particular memory bank such as memory bank 904 may be the closest to processor 100 and thus may be assigned as the first memory bank in a memory map for processor 100, the same memory bank 904 may be assigned as memory bank No. 5 for processor No. 2. Of course, it is to be understood that the embodiment of FIG. 4 is only applicable to applications wherein the shuffling of memory banks in the memory map of processor 100 with respect to the memory map of processor 400 can be monitored and accounted for.

It is important to note that the present invention may be practiced by assignment of memory banks to a memory map of a processor based only on a respective physical and/or electrical distance to the processor. It is to be understood that other physical parameters such as thermal considerations in an area surrounding each memory bank can be used to assign one memory bank a lower portion of the memory map of the processor with respect to another memory bank.

If wait states are used in accordance with the principles of the present invention, then sequencing of the memory banks may or may not be necessary or desirable.

While the invention has been described with reference to the exemplary embodiments thereof, those skilled in the art will be able to make various modifications to the described embodiments of the invention without departing from the true spirit and scope of the invention.

What is claimed is:

1. A processing system comprising:

a plurality of memory banks; and a processor having a memory map;

each of said plurality of memory banks being assigned in order to said memory map of said processor based on a respective distance to said processor.

2. The processing system according to claim 1, further comprising:

a wait state generator to generate a wait state for at least one of said plurality of memory banks.

3. The processing system according to claim 1, wherein:

individual ones of said plurality of memory banks have different numbers of wait states associated therewith.

4. The processing system according to claim 2, further comprising:

a wait state look-up table containing a number of wait states for each of said plurality of memory banks.

5. The processing system according to claim 4, wherein:

said wait state look-up table is adjusted as operating conditions of said processing system change.

6. The processing system according to claim 1, wherein:

said memory map is a contiguous memory map.

7. The processing system according to claim 1, wherein:

said distance to said processor is a physical distance.

8. The processing system according to claim 1, wherein:

said distance to said processor is an electrical distance.

9. The processing system according to claim 1, wherein:

said distance is a variable based on a physical and electrical proximity to said processor.

10. A processing system comprising:

a memory bank;

at least two processors each having a memory map;

said memory bank being assigned to said memory map of each of said at least two processors based on a respective distance to each of said at least two processors; and each of said at least two processors being adapted for operation at a similar frequency, each of said at least two processors having a different number of wait states with respect to accesses to said memory bank.

11. The processing system according to claim 10, wherein:

said different number of wait states for each of said at least two processors is based on a physical distance between said respective one of said two processors and said memory bank.

12. The processing system according to claim 10, wherein:

said different number of wait states for each of said at least two processors is based on an electrical distance between said respective one of said two processors and said memory bank.

13. The processing system according to claim 10, wherein:

said memory map is a contiguous memory map.

14. A method of assigning a plurality of memory banks to a contiguous memory map of an accessing processor, comprising:

correlating an ordering of said plurality of memory banks in said contiguous memory map with an ordering of respective distances of said plurality of memory banks from said accessing processor.

15. The method of assigning a plurality of memory banks to a contiguous memory map of an accessing processor according to claim 14, wherein:

said respective distance is a physical distance.

16. The method of assigning a plurality of memory banks to a contiguous memory map of an accessing processor according to claim 14, wherein:

said respective distance is an electrical distance.

17. Apparatus for assigning a plurality of memory banks to a contiguous memory map of an accessing processor, comprising:

means for correlating an ordering of said plurality of memory banks in said contiguous memory map with an ordering of respective distances of said plurality of memory banks from said accessing processor.

18. The apparatus for assigning a plurality of memory banks to a contiguous memory map of an accessing processor according to claim 17, wherein:

said respective distance is a physical distance.

19. The apparatus for assigning a plurality of memory banks to a contiguous memory map of an accessing processor according to claim 17, wherein:

said respective distance is an electrical distance.

* * * * *